United States Patent
Briscoe et al.

(10) Patent No.: US 7,828,301 B2
(45) Date of Patent: Nov. 9, 2010

(54) SELF-ENERGIZED BACKUP RING FOR ANNULAR SEALS

(75) Inventors: Michael Briscoe, Lehi, UT (US); James McPherson, Sandy, UT (US); David S. Pixton, Lehi, UT (US)

(73) Assignee: IntelliServ, LLC, Houston, TX (US)

( * ) Notice: Subject to any disclaimer, the term of this patent is extended or adjusted under 35 U.S.C. 154(b) by 347 days.

(21) Appl. No.: 12/019,897

(22) Filed: Jan. 25, 2008

(65) Prior Publication Data

US 2009/0189358 A1 Jul. 30, 2009

(51) Int. Cl.
*F16L 17/06* (2006.01)
*F16J 15/02* (2006.01)

(52) U.S. Cl. .................. 277/611; 277/638; 285/368; 285/349

(58) Field of Classification Search .......... 277/579, 277/581–582, 584, 586–589, 611, 638, 500, 277/505, 569; 285/368, 349
See application file for complete search history.

(56) References Cited

U.S. PATENT DOCUMENTS

| | | | |
|---|---|---|---|
| 2,456,356 A | 12/1948 | Aber | |
| 2,462,586 A | 2/1949 | Whittingham | |
| 2,739,855 A * | 3/1956 | Bruning | 277/584 |
| 2,747,954 A | 5/1956 | Damm et al. | |
| 3,132,869 A * | 5/1964 | Campbell | 277/584 |
| 3,362,720 A | 1/1968 | Henry et al. | |
| 3,394,941 A | 7/1968 | Traub | |
| 3,455,566 A * | 7/1969 | Hull et al. | 277/582 |
| 3,522,950 A | 8/1970 | Schneck, Jr. | |
| 3,693,986 A * | 9/1972 | Lambie | 277/638 |
| 4,034,993 A | 7/1977 | Okada et al. | |
| 4,674,754 A | 6/1987 | Lair et al. | |
| 5,118,119 A | 6/1992 | Ditlinger | |
| 5,123,662 A | 6/1992 | Sugimura | |
| 6,173,968 B1 | 1/2001 | Nelson et al. | |
| 6,758,478 B1 | 7/2004 | Moreno | |
| 6,943,222 B2 * | 9/2005 | Yoneda et al. | 526/63 |
| 7,516,963 B2 * | 4/2009 | Meller | 277/584 |
| 2004/0135319 A1 | 7/2004 | Moreno | |

\* cited by examiner

*Primary Examiner*—Vishal Patel
(74) *Attorney, Agent, or Firm*—Victor Segura; Daniel P. Nelson

(57) ABSTRACT

An apparatus is disclosed in one embodiment of the invention as including an annular seal (e.g., an o-ring) and a backup ring to provide support to the annular seal. A gland is provided to accommodate the backup ring and the annular seal. The gland has a contact surface which is adapted to contact a corresponding contact surface of the backup ring upon inserting the backup ring into the gland. The diameters of the contact surfaces of the backup ring and gland are sized such that the contact surface of the backup ring radially interferes with the contact surface of the gland, thereby urging the backup ring out of the gland. A retention mechanism, such as interlocking grooves, protrusions, ridges, notches, slots, or the like may be provided in the backup ring and gland respectively to prevent the backup ring from completely exiting the gland.

15 Claims, 3 Drawing Sheets

SELF-ENERGIZED BACKUP RING FOR ANNULAR SEALS

BACKGROUND OF THE INVENTION

1. Field of the Invention

This invention relates to mechanical seals, and more particularly to self-energized backup rings for mechanical seals such as o-rings.

2. Description of the Related Art

Mechanical seals are used extensively to join systems or mechanical elements together to prevent leakage, contain pressure, or exclude contamination. O-rings are one of the most commonly used mechanical seals because of their simplicity and reliability. An o-ring is an elastomeric loop having a round (or rounded) cross-section that is designed to fit in a groove or gland in one or more sealing faces. The o-ring is compressed as the sealing faces are urged together, creating a seal at the interface. O-rings may be designed to have different diameters, cross-sectional areas, and cross-sectional shapes for different applications. Similarly, the glands or grooves they reside in may be designed to have different shapes and sizes.

In general, the pressure an o-ring is able to resist is directly related to the clearance gap between the sealing faces. The larger the gap, the less pressure the o-ring is able to resist without the aid of an external support. This is because the o-ring may begin to extrude into the clearance gap and cause damage to the o-ring as pressures are increased above a certain threshold. Various techniques may be used to reduce the o-ring's tendency to extrude, such as decreasing the clearance gap, selecting o-ring materials with an increased modulus of elasticity, or using backup rings to fill the clearance gap and thereby prevent the o-ring from extruding into the gap. Backup rings are a common choice for preventing extrusion and may be used in applications where pressures exceed 1500 psi.

When system pressure exceeds 1500 psi, there are generally two choices for producing an acceptable seal. The first and most costly choice is to maintain very tight machining tolerances on the mating components. The second more economical choice is to provide a backup ring to reduce o-ring extrusion into the clearance gap. This allows the mating components to be machined with normal tolerances.

While advantageous and effective, conventional backup rings may have various shortcomings. For example, some backup rings may be energized by the o-ring, meaning that compressing the o-ring also urges the backup ring into the clearance gap. While effective in some applications, such backup rings may not fill the clearance gap completely, be ineffective to fill larger gaps, or not function adequately at very high pressures. This may allow the o-ring to extrude into any remaining gap or be pinched between the backup ring and the sealing face. Furthermore, it may be difficult to retain current backup rings within the gland, especially in face seal applications. That is, prior to joining the mating surfaces, current backup rings may be easily dislodged from the gland, particularly in face seal applications.

In view of the foregoing, what is needed is an improved backup ring that improves many of the shortcomings of the prior art. Ideally, a backup ring would be self-energized rather than energized by the o-ring. Such a backup ring would also ideally bridge large gaps while still being effective at very high pressures. Further needed is a backup ring that is easily retained within the gland and may also help to retain the o-ring within the gland, particularly in face seal applications.

Yet further needed is a backup ring that is effective to seal very high pressures with very little pressure exerted between the sealing faces.

SUMMARY OF THE INVENTION

The present invention has been developed in response to the present state of the art, and in particular, in response to the problems and needs in the art that have not yet been fully solved by currently available backup rings for annular seals. Accordingly, the present invention has been developed to provide an improved backup ring for annular seals such as o-rings. The features and advantages of the present invention will become more fully apparent from the following description and appended claims, or may be learned by practice of the invention as set forth hereinafter.

Consistent with the foregoing and in accordance with the invention as embodied and broadly described herein, an apparatus is disclosed in one embodiment of the invention as including an annular seal (e.g., an o-ring) and a backup ring to provide support to the annular seal. A gland is provided to accommodate the backup ring and the annular seal. The gland has a contact surface that is adapted to contact a corresponding contact surface of the backup ring upon inserting the backup ring into the gland. The diameters of the contact surfaces of the backup ring and the gland are sized such that they radially interfere with one another, thereby urging the backup ring out of the gland. A retention mechanism, such as interlocking grooves, protrusions, ridges, notches, slots, or the like may be incorporated into the backup ring and the gland respectively to prevent the backup ring from completely exiting the gland.

In selected embodiments, the contact surfaces of the backup ring and gland respectively are along their outside diameters. In other embodiments, the contact surfaces of the backup ring and gland are along their inside diameters. In certain embodiments, the backup ring and gland together create a dovetail-shaped recess to retain the annular seal within the gland. In certain embodiments, the backup ring is fabricated from at least one of a metal, a metal alloy, a plastic, a polymer, and hardened rubber. In selected embodiments, the annular seal is one of a face seal and a tapered seal.

In another aspect of the invention, a method in accordance with the invention may include providing a backup ring to provide support to an annular seal. The backup ring may be inserted into a gland. The diameter of the backup ring may be sized to radially interfere with the gland, thereby urging the backup ring out of the gland. The backup ring may nevertheless be retained at least partially within the gland.

In another aspect of the invention, an apparatus in accordance with the invention may include a backup ring to provide support to an annular seal. A gland is provided to accommodate the backup ring and the annular seal. The diameters of the backup ring and gland are sized to generate hoop stress in the backup ring upon inserting the backup ring into the gland. This hoop stress urges the backup ring out of the gland. A retention mechanism is provided to prevent the backup ring from completely exiting the gland.

The present invention provides a novel backup ring for mechanical seals. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
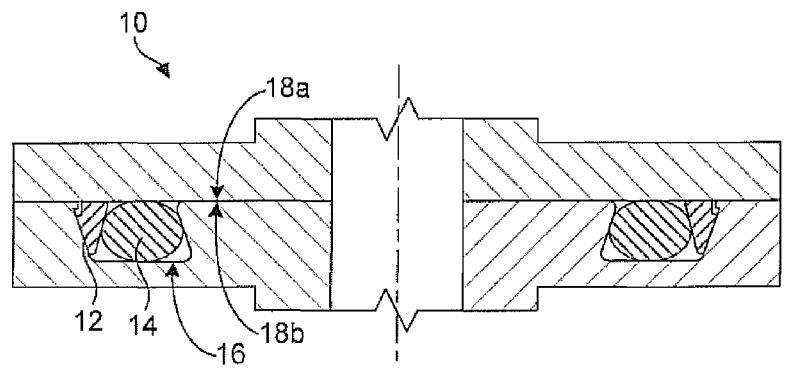
FIG. 1 is a cross-sectional view of one embodiment of a backup ring in accordance with the invention, incorporated into a face seal.

Referring to FIG. 1, one embodiment of a face seal 10 incorporating a self-energized backup ring 12 in accordance with the invention is illustrated. As shown, the face seal 10 may include an annular seal 14, such as an o-ring 14, residing in a gland 16 formed in one of two faces 18a, 18b, or mating surfaces 18a, 18b. The self-energized backup ring 12 may also reside in the gland 16 and may provide support to the annular seal 14 to prevent extrusion thereof into any clearance gap that may exist between the mating surfaces 18a, 18b. Ideally, the backup ring 12 will fill the clearance gap as much as possible to prevent the extrusion.

The annular seal 14 may be fabricated from any suitable material including natural rubbers, synthetic rubbers, or other natural, synthetic, or semi-synthetic elastomers. The choice of material may ultimately depend on criteria such as temperature, sealing pressure, lubrication requirements, or the like associated with the application. The annular seal 14 may have any number of profiles, including circular, square, x-shaped, or other profiles known to those of skill in the art. Similarly, the self-energized backup ring 12 may be fabricated from any material having suitable hardness and resiliency to support the annular seal 14, such as various metals, metal alloys, plastics, hardened rubbers, polymers, or the like.

Figure 2:
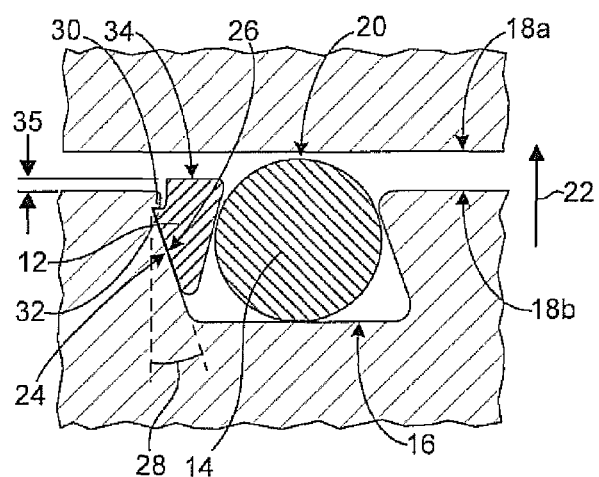
FIG. 2 is an enlarged cross-sectional view of the backup ring and face seal of FIG. 1.

Referring to FIG. 2, prior to joining the mating surfaces 18a, 18b together, a top surface 20 of the annular seal 14 may reside at a position above the mating surface 18b. Upon bringing the mating surfaces 18a, 18b together, the annular seal 14 may be compressed to generate a seal at the interface. The size of the annular seal 14 and the distance it protrudes from the mating surface 18b prior to being compressed are design criteria known to those of skill in the art.

A self-energized backup ring 12 in accordance with the invention may reside within the gland 16 and be urged in a generally upward direction 22 out of the gland 16. This may be accomplished by providing a backup ring 12 with an outside diameter that is slightly larger than the outside diameter of the gland 16. This will create radial interference between the two contact surfaces 24, 26. This radial interference, in combination with the angled orientation of the contact surfaces 24, 26 (characterized by an angle 28) will generate force urging the backup ring 12 in the direction 22 relative to the mating surface 18b. The size of the angle 28 and the amount of radial interference between the contact surfaces 24, 26 may be adjusted to vary the force urging the backup ring 12 in the direction 22. For example, a larger angle 28 may tend to generate greater force in the direction 22. In selected embodiments, the contact surfaces 24, 26 may be machined, polished, or lubricated to reduce friction between the contact surfaces 24, 26, thereby increasing the backup ring's propensity to move in the direction 22.

Due to the radial interference between the backup ring 12 and the gland 16, the backup ring 12 may tend to exit the gland 16 altogether absent some device or mechanism to prevent the exit. Thus, in selected embodiments, a retention mechanism may be provided to retain the backup ring 12 within the gland 16. In selected embodiments, this retention mechanism may include a surface feature 30, such as a ridge, protrusion, ledge, groove, or the like, incorporated into the gland 16. This surface feature 30 may engage a corresponding surface feature 32, such as a ridge, protrusion, ledge, groove, or the like, incorporated into the backup ring 12.

The surface feature 30 of the gland 16 may be designed (e.g., sized, shaped, etc.) to allow the backup ring 12 to be installed into (e.g., snapped into) the surface feature 30, while preventing the backup ring 12 from completely exiting the gland 16. Thus, in selected embodiments, the surface feature 30 may include a chamfer or rounded surface to allow the backup ring 12 to be installed into the gland 16. The surface features 30, 32 may allow downward movement of the backup ring 12 relative to the mating surface 18b until the backup ring 12 nears or contacts the bottom of the gland 16. Similarly, the surface features 30, 32 may allow upward movement of the backup ring 12 relative to the mating surface 18b until the surface features 30, 32 come into contact. A top surface 34 of the backup ring 12 may protrude a certain distance 35 from the mating surface 18b when the surface features 30, 32 are in contact.

The cross-section of the gland 16 and backup ring 12 may be formed in various different shapes to provide different features. For example, the gland 16 and backup ring 12, as illustrated in FIG. 2, may be shaped to form a dovetail-shaped recess that is helpful to retain the annular seal 14 within the gland 16. The resilient annular seal 14 may be inserted into the gland 16 by simply pushing the seal 14 into the dovetail-shaped recess.

Figure 3:
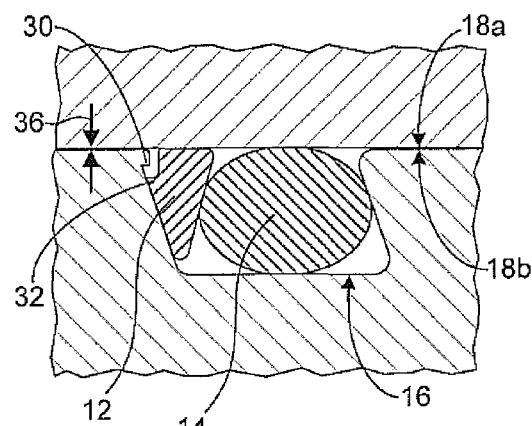
FIG. 3 is an enlarged cross-sectional view of the backup ring and face seal of FIG. 1 when the clearance gap is very small.

Referring to FIG. 3, upon bringing the mating surfaces 18a, 18b together, the backup ring 12 may be urged into the gland 16. This will generate space between the surface features 30, 32 and the backup ring 12 will automatically fill any clearance gap 36 that may exist between the mating surfaces 18a, 18b without requiring assistance from the annular seal 14. Similarly, the annular seal 14 may be compressed to provide a seal between the mating surface 18a and the gland 16.

Figure 4:
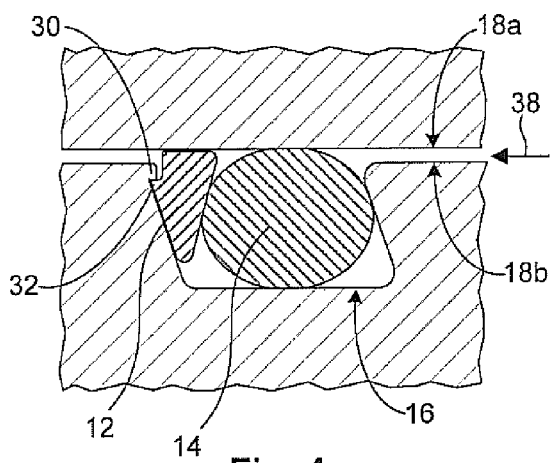
FIG. 4 is an enlarged cross-sectional view of the backup ring and face seal of FIG. 1 when the clearance gap is relatively large.

Referring to FIG. 4, when the clearance gap 36 increases, the backup ring 12 may automatically fill the clearance gap 36 up until the surface feature 32 of the backup ring 12 contacts the surface feature 30 of the gland 16. Thus, the backup ring 12 and the gland 16 may be designed to fill a maximum clearance gap 36. Because the backup ring 12 is self-energized, the backup ring 12 may firmly contact the mating surface 18a regardless of the force exerted on the backup ring 12 by the annular seal 14. When pressure exerts a force in a direction 38 against the annular seal 14, the backup ring 12 will provide backup support to the seal 14 to prevent or reduce extrusion into the clearance gap 36.

A design similar to the backup ring 12 illustrated in FIGS. 1 through 4 has been shown to maintain pressure integrity in the presence of very high pressures (e.g., 8-15K psi) even where the clearance gap 36 is relatively large (e.g., 20 mils or more). For example, using a design similar to the illustrated embodiment, an o-ring 14 and backup ring 12 was shown to maintain an effective seal up to a pressure of 14.5K psi with a clearance gap of approximately 20 mils, at which point the seal began to leak. This seal 14 and backup ring 12 re-sealed after the pressure was lowered to 13K psi. Furthermore, the mating surfaces 18a, 18b were brought together using a threaded connection that was tightened by hand, showing that the seal 14 and backup ring 12 may maintain pressure integrity with only minimal force exerted between the mating surfaces 18a, 18b.

Figure 5:
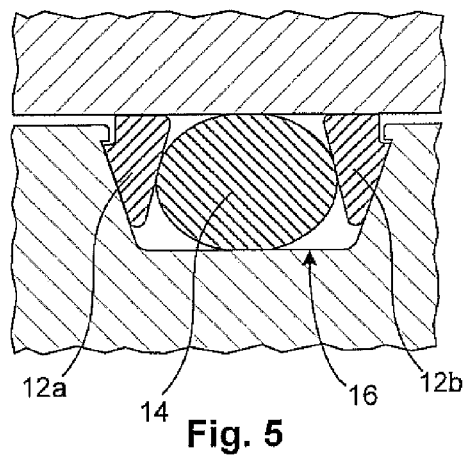
FIG. 5 is an enlarged cross-sectional view of one embodiment of a face seal utilizing dual backup rings.

Referring to FIG. 5, in other embodiments of the invention, a backup ring 12 in accordance with the invention may be installed on an inside diameter of the gland 16 either in place of or in addition to the backup ring 12 illustrated in FIG. 4. For example, dual backup rings 12a, 12b may be installed on the inside and outside diameters of the gland 16 to provide support to an annular seal 14 in either direction. Such a design may be useful where high pressures alternate from one side of the seal 14 to the other.

In embodiments where a backup ring 12b is installed on the inside diameter of the gland 16, the inside diameter of the backup ring 12b may be sized to be slightly smaller than the inside diameter of the gland 16 to create radial interference between the two contact surfaces. This radial interference in combination with the angled orientation of the contact surfaces may urge the backup ring 12b out of the gland 16 toward the mating surface 18a, like the previous examples.

Figure 6:
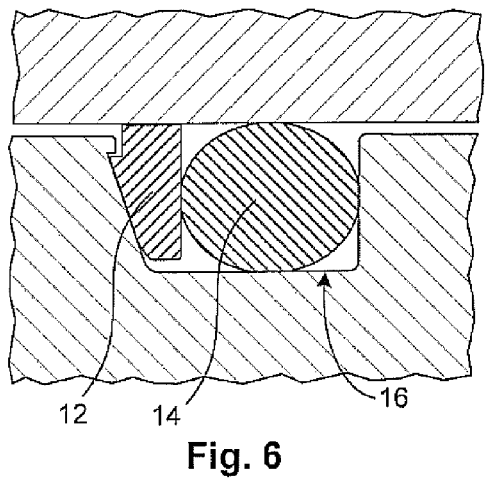
FIG. 6 is an enlarged cross-sectional view of another embodiment of a backup ring in a face seal.
Figure 7:
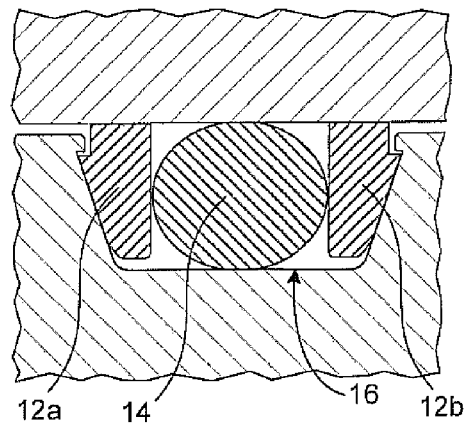
FIG. 7 is an enlarged cross-sectional view of another embodiment of a face seal utilizing dual backup rings.

Referring to FIGS. 6 and 7, in selected embodiments, a backup ring 12 and gland 16 in accordance with the invention may be designed to have various different shapes and configurations. For example, a backup ring 12 and gland 16 may be designed such that together they form a substantially rectangular recess to accommodate the annular seal 14. FIG. 6 shows an embodiment using a single backup ring 12. FIG. 7 shows an embodiment using dual backup rings 12a, 12b.

Figure 8:
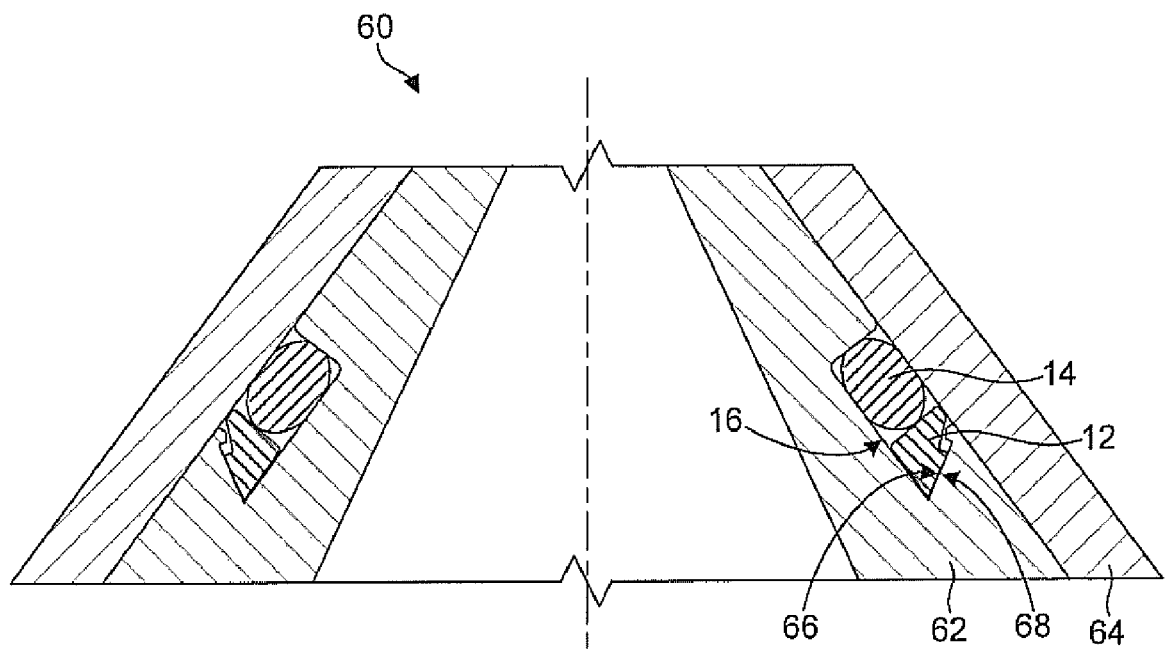
FIG. 8 is a cross-sectional view of another embodiment of a backup ring incorporated into a tapered seal.

Referring to FIG. 8, in another embodiment, a self-energized backup ring 12 may be incorporated into a tapered seal 60 and may operate in a similar manner to the backup seal 12 of FIG. 1. More specifically, an annular seal 14 may provide a seal between the tapered conical members 62, 64. To self-energize the backup ring 12, an outside diameter 66 of the backup ring 12 may be sized to radially interfere with an outside diameter of the gland 16. This radial interference will create hoop stress in the ring 12 that will urge the backup ring 12 out of the gland 16 and against the inside diameter of the tapered conical member 64.

Figure 9:
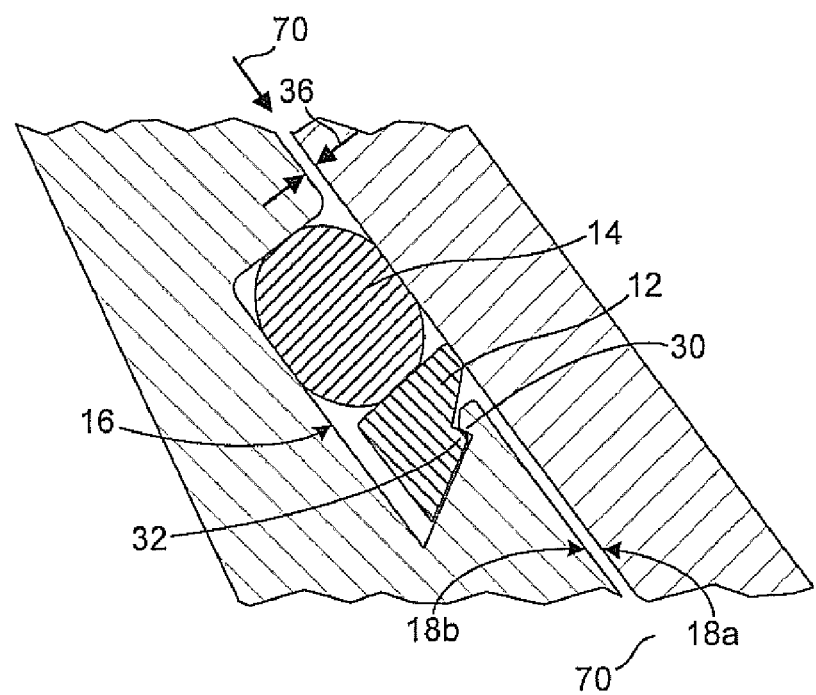
FIG. 9 is an enlarged cross-sectional view of the backup ring and tapered seal of FIG. 8.

Referring to FIG. 9, when a clearance gap 36 exists between the mating surfaces 18a, 18b, the radial interference between the backup ring 12 and the gland 16 will cause the backup ring 12 to fill the clearance gap 36. This will provide support to the annular seal 14 and prevent extrusion into the clearance gap 36 when pressure pushes from a direction 70. Like the embodiment illustrated in FIG. 1, a retention mechanism may be provided to retain the backup ring 12 within the gland 16. This retention mechanism may include a surface feature 30 (e.g., a ridge, protrusion, ledge, groove, or the like) incorporated into the gland 16 and adapted to engage a corresponding surface feature 32 incorporated into the backup ring 12.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an annular seal;
   a backup ring to provide support to the annular seal;
   a gland formed in a first planar mating surface positioned opposite a second planar mating surface, the gland accommodating the backup ring and the annular seal, the gland comprising a first contact surface forming an acute angle relative to a normal of the first planar mating surface, and the backup ring comprising a second contact surface also forming an acute angle relative to the normal of the first planar mating surface, wherein the second contact surface is substantially parallel to the first contact surface;
   wherein the backup ring and annular gland are sized such that pushing the backup ring into the annular gland increases radial interference between the first and second contact surfaces, wherein the radial interference combined with the angled orientation of the first and second contact surfaces generates a force urging the backup ring toward the second planar mating surface independent of any force exerted on the backup ring by the annular seal, thereby causing the backup ring to substantially fill any clearance gap between the first and second planar mating surfaces; and
   a retention mechanism to prevent the backup ring from completely exiting the gland.

2. The apparatus of claim 1, wherein the first and second contact surfaces are on outside diameters of the backup ring and gland respectively.

3. The apparatus of claim 1, wherein the first and second contact surfaces are on inside diameters of the backup ring and gland respectively.

4. The apparatus of claim 1, wherein the backup ring and gland together create a dovetail-shaped recess to retain the annular seal within the gland.

5. The apparatus of claim 1, wherein the retention mechanism comprises a first surface feature on the backup ring adapted to engage a corresponding second surface feature on the gland, wherein the first surface feature is one of a protruding and indented feature on the backup ring, and the second surface feature is one of a protruding and indented feature on the gland.

6. The apparatus of claim 5, wherein the first and second surface features are selected from the group consisting of grooves, ridges, notches, and slots.

7. The apparatus of claim 1, wherein the backup ring is fabricated from at least one of a metal, a metal alloy, a plastic, a polymer, and hardened rubber.

8. The apparatus of claim 1, wherein the annular seal is an o-ring.

9. A method comprising:
providing an annular seal and a backup ring to provide support to the annular seal;
inserting the backup ring and annular seal into a gland, wherein the gland is formed in a first planar mating surface positioned opposite a second planar mating surface, the gland comprising a first contact surface forming an acute angle relative to a normal of the first planar mating surface, and the backup ring comprising a second contact surface also forming an acute angle relative to the normal of the first planar mating surface, the first contact surface being substantially parallel to the second contact surface;
wherein the backup ring and annular gland are sized such that pushing the backup ring into the annular gland increases radial interference between the first and second contact surfaces, wherein the radial interference combined with the angled orientation of the first and second contact surfaces generates a force urging the backup ring toward the second planar mating surface independent of any force exerted on the backup ring by the annular seal, thereby causing the backup ring to substantially fill any clearance gap between the first and second planar mating surfaces; and
retaining the backup ring within the gland such that it is prevented from completely exiting the gland.

10. The method of claim 9, wherein the first and second contact surfaces are on outside diameters of the backup ring and gland respectively.

11. The method of claim 9, wherein the first and second contact surfaces are on inside diameters of the backup ring and gland respectively.

12. The method of claim 9, wherein the backup ring and gland together create a dovetail-shaped recess to retain the annular seal within the gland.

13. The method of claim 9, wherein retaining the backup ring comprises providing a first surface feature on the backup ring adapted to engage a corresponding second surface feature on the gland, wherein the first surface feature is one of a protruding and indented feature on the backup ring, and the second surface feature is one of a protruding and indented feature on the gland.

14. The method of claim 9, wherein the backup ring is fabricated from at least one of a metal, a metal alloy, a plastic, a polymer, and hardened rubber.

15. The method of claim 9, wherein the annular seal is an o-ring.

* * * * *